United States Patent [19]

Watanabe et al.

[11] Patent Number: 4,870,456

[45] Date of Patent: Sep. 26, 1989

[54] DEVELOPING-UNIT SHIFTING APPARATUS WITH TWO SPEED COOLING FAN

[75] Inventors: Junji Watanabe, Yokohama; Hidetaka Nonami, Tokyo; Takeshi Eguchi, Oomiya, all of Japan

[73] Assignee: Kabushiki Kaisha Toshiba, Kawasaki, Japan

[21] Appl. No.: 146,209

[22] Filed: Jan. 20, 1988

[30] Foreign Application Priority Data

| | | | |
|---|---|---|---|
| Jan. 23, 1987 | [JP] | Japan | 62-13478 |
| Jan. 29, 1987 | [JP] | Japan | 62-18936 |
| Jan. 29, 1987 | [JP] | Japan | 62-18937 |

[51] Int. Cl.[4] ........ G03G 15/00; G03B 27/52

[52] U.S. Cl. ........ 355/245; 355/30; 355/326

[58] Field of Search ........ 355/4, 14 D, 3 DD, 7, 355/14 R, 30, 3 R

[56] References Cited

U.S. PATENT DOCUMENTS

| | | | |
|---|---|---|---|
| 3,960,444 | 6/1976 | Gundlach et al. | 355/3 DD |
| 4,522,483 | 6/1985 | Matsumoto et al. | 355/14 R X |
| 4,769,669 | 9/1988 | Watanabe | 355/3 DD X |
| 4,801,966 | 1/1989 | Ikeda | 355/245 |

FOREIGN PATENT DOCUMENTS

3611558A1 10/1986 Fed. Rep. of Germany .

*Primary Examiner*—A. T. Grimley
*Assistant Examiner*—Edward Pipala
*Attorney, Agent, or Firm*—Foley & Lardner, Schwartz, Jeffery, Schwaab, Mack, Blumenthal & Evans

[57] ABSTRACT

A developing-unit shifting apparatus has a photoconductive drum. A latent image corresponding to an original image is formed on the drum, and is developed by means of a first or second developing unit. These developing units are supported so that they can be associated with and disengaged from the drum. In the beginning of the copying operation, the first or second developing unit is affected so as to engage the drum. At the end of the copying operation, both these developing units are separated from the drum.

8 Claims, 7 Drawing Sheets

DEVELOPING-UNIT SHIFTING APPARATUS WITH TWO SPEED COOLING FAN

BACKGROUND OF THE INVENTION

The present invention relates to a developing-unit shifting apparatus used in an image forming apparatus, such as an electronic copying machine.

Recently copying machines have been developed which perform multicolor copying. One such copying machine comprises a plurality of developing units which are stored individually with developing agents of different colors. These developing units are supported so that they can be associated with and disengaged from a photoconductive drum. Only one of the developing units, which contains the developing agent of a designated color, is selected and brought into contact with the drum.

The surface of the photoconductive drum is very susceptible to damage. If the selected developing unit is always in contact with the drum as aforesaid, therefore, the drum may possibly be damaged. If copying is effected with use of such a damaged drum, the quality of resulting images will be poor.

SUMMARY OF THE INVENTION

The object of the present invention is to provide a developing-unit shifting apparatus, capable of protecting an image carrier from damage, thereby preventing resulting images from being lowered in quality.

According to an aspect of the present invention, there is provided a developing-unit shifting apparatus, which comprises an image carrier for carrying thereon an image corresponding to an original image; developing means for developing the image carried on the image carrier; shifting means for supporting the developing means so that the developing means can be associated with and disengaged from the image carrier; and drive means for driving the shifting means so that the developing means is brought into contact with the image carrier at the start of developing operation and is separated from the image carrier after the developing operation.

Thus, according to the present invention, the developing means is brought into contact with the image carrier at the start of the developing operation. When the developing operation is not expected, the developing means is separated from the image carrier.

DETAILED DESCRIPTION OF THE PREFERRED EMBODIMENTS

An embodiment of the present invention will now be described in detail with reference to the accompanying drawings.

Figure 1:
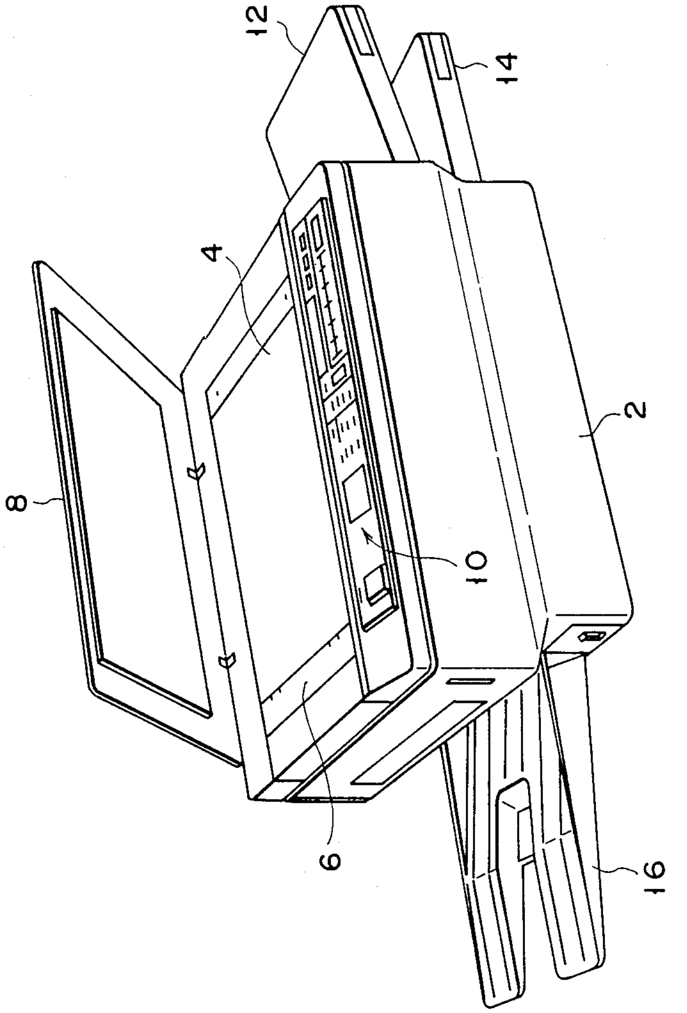
FIG. 1 is an external perspective view of an electronic copying machine using a developing-unit shifting apparatus according to the present invention.

FIG. 1 schematically shows a copying machine which uses a shifting apparatus according to the present invention. In FIG. 1, numeral 2 designates a housing. An original table (transparent glass) 4 for retaining an original is fixed on the top surface of housing 2. Fixed scale 6 is provided on one side of table 4. This scale serves as a reference mark for the original setting. Located beside table 4, swingable original cover 8 is supported on housing 2. Control panel 10 is mounted on the front side of the top surface of housing 2. Upper and lower sheet cassettes 12 and 14 are attached to one side of housing 2, and receiving tray 16 is attached to the other side.

Figure 2:
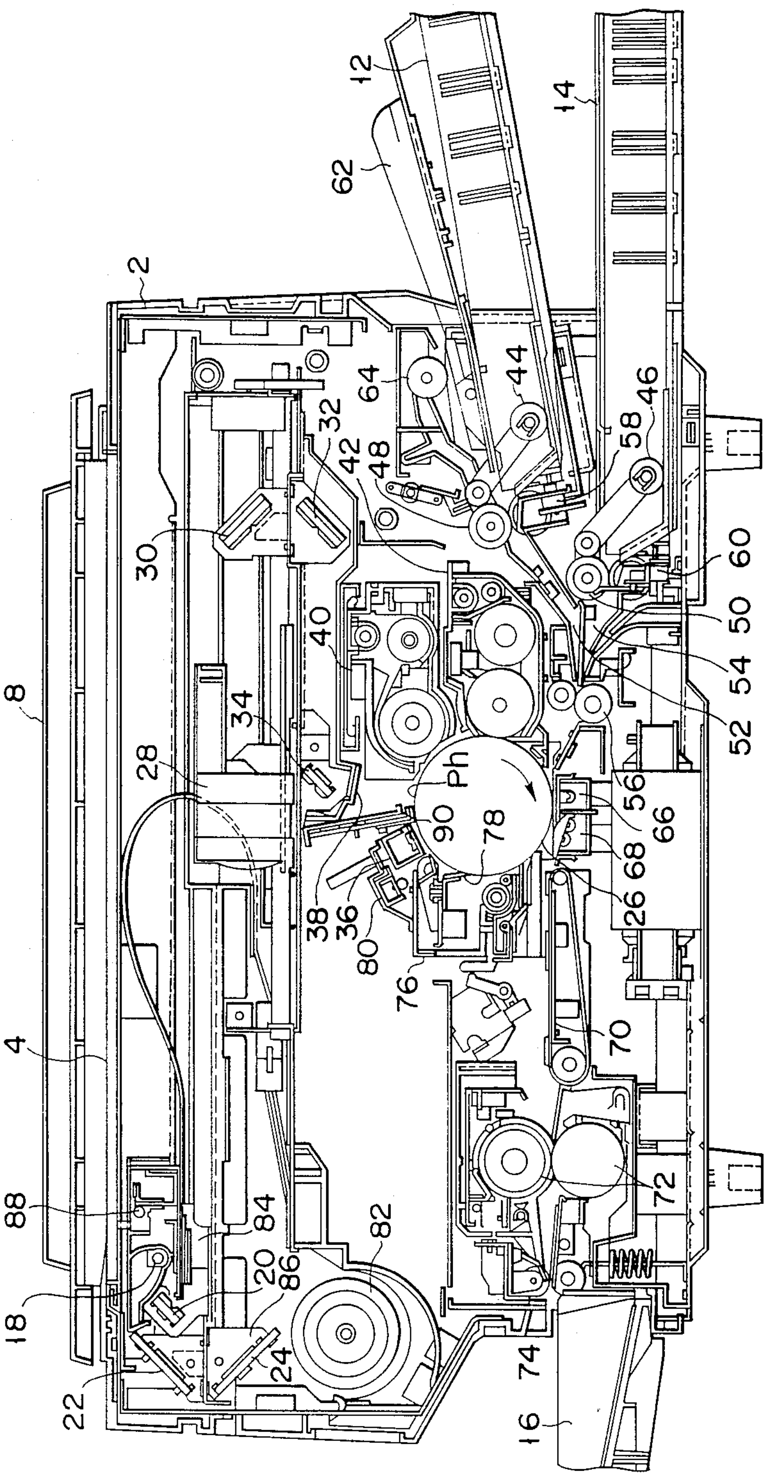
FIG. 2 is a side sectional view of the copying machine shown in FIG. 1.

As shown in FIG. 2, an optical system, including exposure lamp 18 and mirrors 20, 22 and 24, is disposed under original table 4. The optical system is adapted to reciprocate along the underside of table 4. As it moves forward, the original on table 4 is exposed for scanning. While the optical system is reciprocating, mirrors 22 and 24 are moved at a speed half that of mirror 20 and lamp 18 so that the length of an optical path, extending from the original to photoconductive drum 26, is kept constant. Light from lamp 18 is applied to the original. The reflected light from the original is successively reflected by mirrors 20, 22 and 24, and then transmitted through lens block 28 for a scale change. The light is further reflected by mirrors 30, 32 and 34, successively, and then guided to drum 26. Thereupon, an image of the original is formed on the surface of drum 26.

Photoconductive drum 26 is rotated in the direction of the FIG. 2 arrow. The surface of drum 26 is first charged by main charger 36. Then, the charged drum surface passes through exposure region ph. At this time, an optical image corresponding to the original image is guided to the drum surface through slit 38. As a result, an electrostatic latent image is formed on the surface of drum 26. This image is visualized by means of first or second developing unit 40 or 42. Thus, a toner image is formed on the drum surface. For example, first and second developing units 40 and 42 store red and black toners, respectively. These developing units are alternately operated, as required. They are removably mounted in housing 2. Control panel 10 indicates the colors of the toners in units 40 and 42. The color indication on panel 10 depends, for example, on the state of connection between a plurality of pins of a pair of connectors (not shown) arranged in housing 2.

Paper sheets are taken out one, by one, from upper or lower cassette 12 or 14 by means of paper-supply roller 44 or 46 and feed rollers 48 or 50. Each sheet is guided to aligning rollers 56 via sheet guide path 52 or 54. Then, the sheet is delivered to a transfer section by means of rollers 56. One of cassettes 12 and 14 is selected by operating cassette selection key 108 (mentioned later) of control panel 10. The sizes of cassettes 12 and 14 are detected by means of cassette-size detection switches 58 and 60, respectively. Switches 58 and 60 are each composed of a plurality of microswitches, which are turned on and off as different sizes of cassettes 12 and 14 are inserted into the apparatus. Sheet-bypass guide 62 is attached to the top portion of upper cassette 12. A paper sheet inserted manually through guide 62 is delivered to feed rollers 48 by means of delivery roller 64. Thereafter, the sheet is transported in the same manner as each sheet fed from upper cassette 12.

Thus delivered to the transfer section, the sheet is caused to adhere to the surface of photoconductive drum 26. In this state, the toner image on drum 26 is transferred to the surface of the sheet by transfer charger 66. Thereafter, the sheet, with the transferred image thereon, is electrostatically separated from drum 26 by means of separation charger 68. The separated sheet is then delivered to a pair of fixing rollers 72 by means of conveyor belt 70. As the sheet passes between rollers 72, the toner image is fixed on the sheet. Thereafter, the sheet is discharged onto tray 16 by means of exit rollers 74.

The remaining toner particles on the surface of photoconductive drum 26, which were not transferred to the surface of the sheet, are removed by means of cleaning blade 78 of cleaner 76. Thereafter, discharge lamp 80 erases a residual image on the surface of drum 26. Thus, the drum surface is restored to its initial state. A cooling fan 82 is used to prevent a temperature rise inside housing 2. Exposure lamp 18 and mirror 20 are mounted on first carriage 84, while mirrors 22 and 24 are mounted on second carriage 86.

First carriage 84 is provided with spot light source 88, which is movable at right angles to the traveling direction of carriage 84.

Erasure array 90 is provided between main charger 36 and exposure region ph of photoconductive drum 26. Array 90 includes a plurality of light emitting elements which are arranged along the longitudinal direction of drum 26. In partially erasing an original image, the emitting elements of array 90 turned on correspond to the designated erasure areas of spot light source 88, for example. Thus, the surface of drum 26 is de-electrified. When the de-electrified surface portion of drum 26 is exposed at exposure region ph, thereafter, no electrostatic latent image can be formed on that portion. In consequence, the original image is erased.

Figure 3:
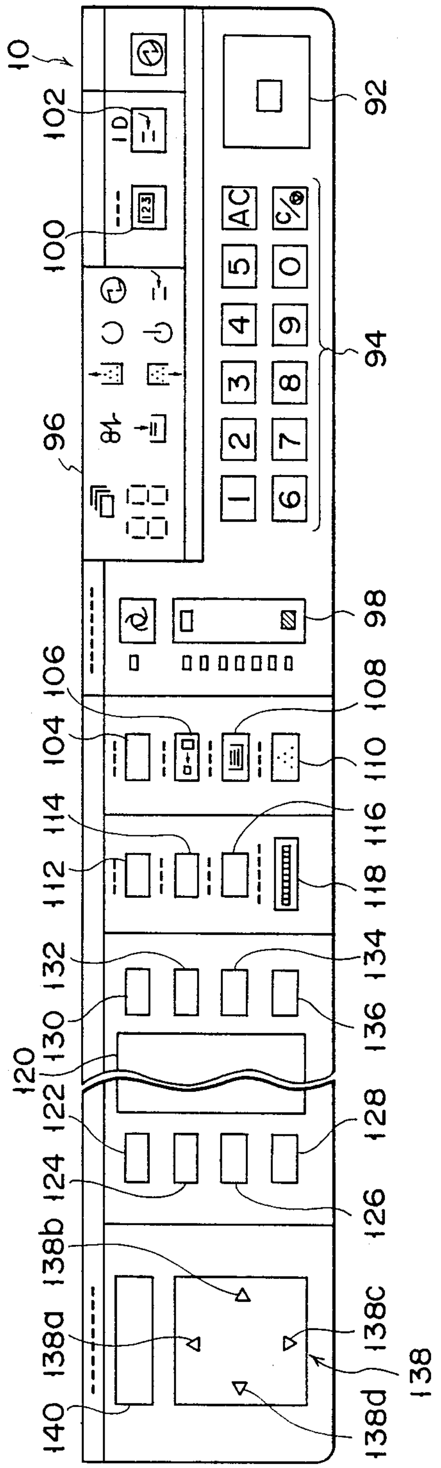
FIG. 3 is a plan view showing a control panel of the copying machine of FIG. 1.

Referring now to control panel 10 of FIG. 3, copy key 92, numeric pad 94, display section 96, density setting section 98, count command key 100, and ID as count key 102 are shown. Copy key 92 gives the copy start command, and numeric pad 94 designates the number of copies to be made and the like. Display section 96 indicates the operating conditions of various parts, if jamming occurs, etc. Setting section 98 is used for setting the copy density. Command key 100 is for indicating the total number of copies, the number of copies of each color, etc. Count key 102 is for indicating the number of copies corresponding to each identification (ID) code, in an ID copy mode such that copying is only permitted when the ID code is identified. Editing key 104, scale setting key 106, cassette selection key 108, color change key 110, mode memory key 112, and information key 114 are also shown. Editing key 104 operates in a multi-copying mode, double-sided copying mode, or partial-erasure mode, such that copying is effected after part of the original image is erased. Setting key 106 sets the copy scale. Selection key 108 is used in selecting upper or lower cassette 12 or 14. Color change key 110 is for changing the toner color in copying. When editing key 104 is operated, for example, the erasure range of the original may be designated by means of spot light source 88. In such a case, the used of memory key 112 causes a memory to store the designated erasure range and the like, or to read out information, such as the erasure range previously stored in the memory. Information key 114 is for to obtaining information corresponding to each mode. If, for example, key 114 is operated in the case where jamming occurs, information for the removal of the jammed material is indicated on a display screen mentioned later. Numeral 116 denotes a function check key. Through the use of check key 116, the setting functions can be indicated on display 120 (mentioned later). Numeral 118 denotes a dial used in adjusting the display light contrast. Numeral 120 designates the display screen which is formed of, e.g., a liquid-crystal dot matrix panel. For example, the characters on display 120 indicate conditions of the copying machine. Thus, when each of keys 100 through 116 is depressed, corresponding characters are displayed. If jamming occurs in the middle of the copying operation, for example, the location of the jamming and the remedy, in characters and diagrams, appear on display 120. Control keys 122 through 136 are arranged on either side of display 120. These keys are used to select the various functions indicated on display 120. Numeral 138 denotes a shifting key for shifting the position of spot light source 88. Key 138 includes arrows 138*a*, 138*b*, 138*c* and 138*d* which are, respectively, indicative of four directions. If arrows 138*a* through 138*d* of key 138 are depressed, the key is tilted in the direction indicated by the selected arrow. When key 138 is operated in this manner, light source 88 is moved in the specified direction corresponding to the tilt of the key. Numeral 140 indicates a position designating key used to input the coordinate position specified by light source 88.

Figure 4:
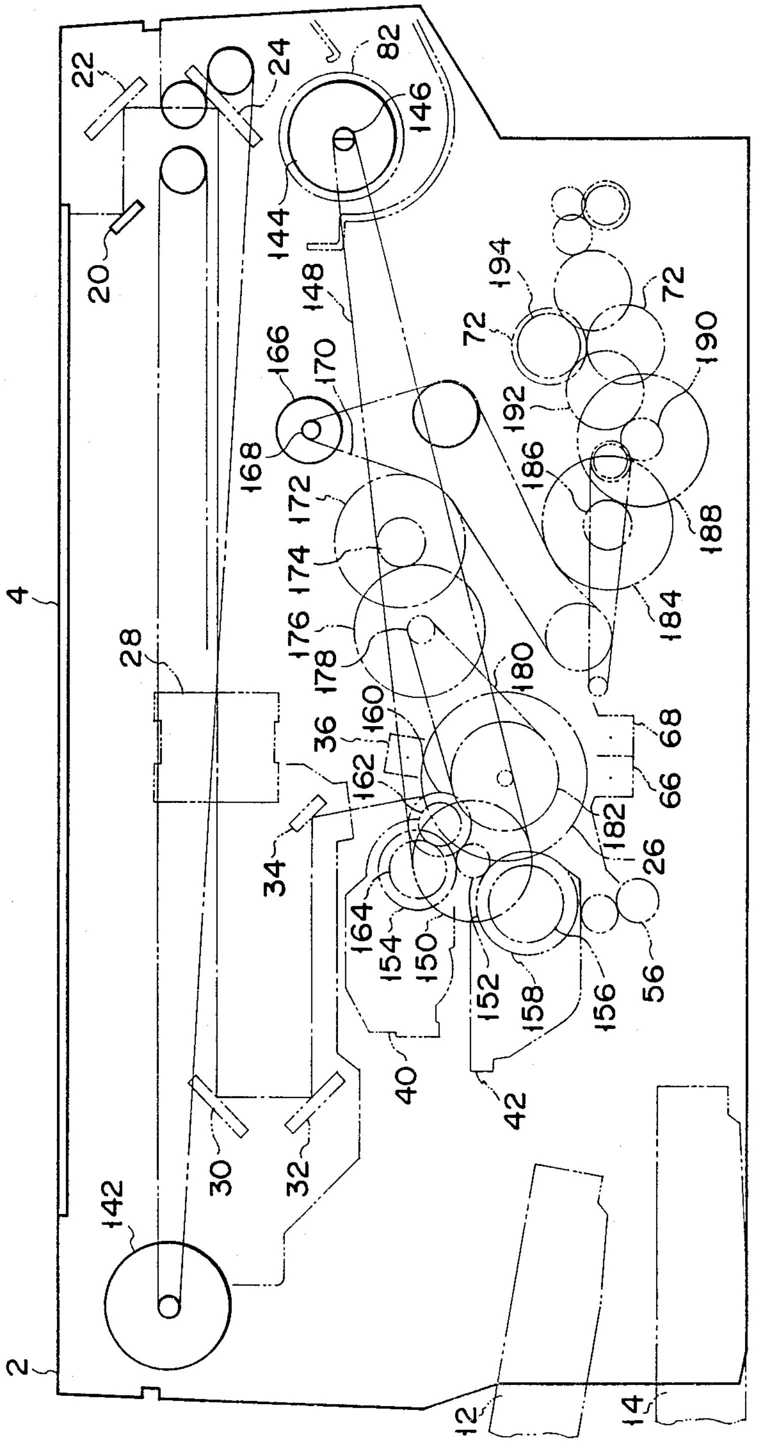
FIG. 4 is a side view schematically showing a drive unit provided inside the copying machine of FIG. 1.

FIG. 4 schematically shows the drive unit of the copying machine. Numeral 142 designates a motor, for driving first and second carriages 84 and 86. Numeral 144 designates another motor, used in driving cooling fan 82. The driving force of motor 144 is transmitted to gear 150 by means of gear 146 and timing belt 148. Gear 150 is fitted with coaxial gear 152. Gear 152 serves to drive developing rollers 154 and 156 of first and second developing units 40 and 42. When second developing unit 42 is selected, gear 152 engages gear 158 which is attached to developing roller 156. When first developing unit 40 is selected, gear 152 engages idle gear 160. Gear 160 is fitted with coaxial gear 162, which meshes with gear 164 attached to developing roller 154.

Motor 166 drives photoconductive drum 26 and fixing rollers 72. The driving force of motor 166 is transmitted to gear 182 by means of gear 168, chain 170, gears 172 through 178, and belt 180. Gear 182 is coaxially aligned with drum 26. Further, the driving force of motor 166 is transmitted to gear 194 by means of chain 170 and gears 184 to 192. Gear 194 is coaxially aligned with fixing rollers 72.

Figure 5:
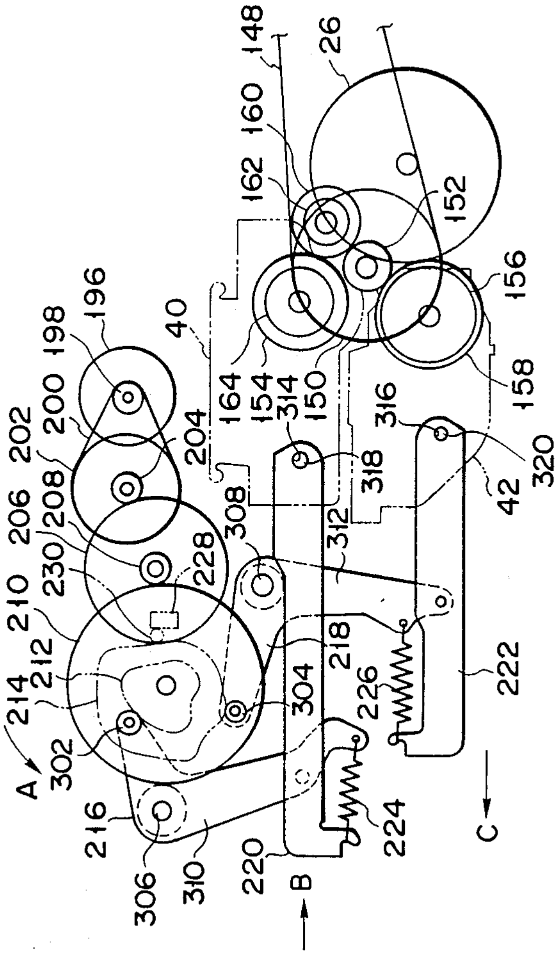
FIG. 5 shows the developing-unit shifting apparatus according to the invention.

FIG. 5 shows a shifting apparatus for developing units 40 and 42. Numeral 196 designates a motor, which alternately associates with or disengages first or second developing unit 40 or 42 from photoconductive drum 26. The driving force of motor 196 is transmitted to gear 210 by means of 198, belt 200, and gears 202 through 208. Gear 210 is fitted with coaxial cams 212 and 214. Cam follower 302 on lever 216, engages cam 212. Similarly, cam follower 304 engages cam 214. Cam follower 304 is provided on lever 218. Levers 216 and 218 are fastened to shafts 306 and 308, respectively. Further, levers 310 and 312 are fastened to shafts 306 and 308, respectively. Levers 310 and 312 are coupled to the middle portions of arms 220 and 222, respectively.

Spring 224 is stretched between arm 220 and lever 310, and spring 225 is stretched between arm 222 and lever 312. Springs 224 and 226 push cam followers 302 and 304 onto cam 212, 214, respectively. Arm 220 has hole 314 in one end, and arm 222 has hole 316 in one end. Pin 318, which protrudes from the front of developing unit 40, is inserted in hole 314. Pin 320, which protrudes from the rear of developing unit 40, is inserted in hole 316.

Controller 230 of switch 228 is in contact with cam 214. Switch 228 detects the positions of developing units 40 and 42.

FIG. 5 shows a state in which second developing unit 42 is selected or allowed to be used for developing. If first developing unit 40 is selected in this state, motor 196 is then actuated. Thereupon, cams 212 and 214 are rotated in the direction of arrow A in FIG. 5, so that arms 220 and 222 are moved in the directions of arrows B and C, respectively, by the action of levers 216 and 218 and levers 310 and 312. Accordingly, second developing unit 42 is moved away from photoconductive drum 26. At the same time, first developing unit 40 is caused to engage drum 26. Switch 228 detects this engagement between unit 40 and drum 26. Motor 196 is stopped in response to a detection output from switch 228.

If second developing unit 42 is then selected, the above procedure of operation is reversely followed as motor 196 rotates. As a result, unit 42 engages drum 26.

Figure 6:
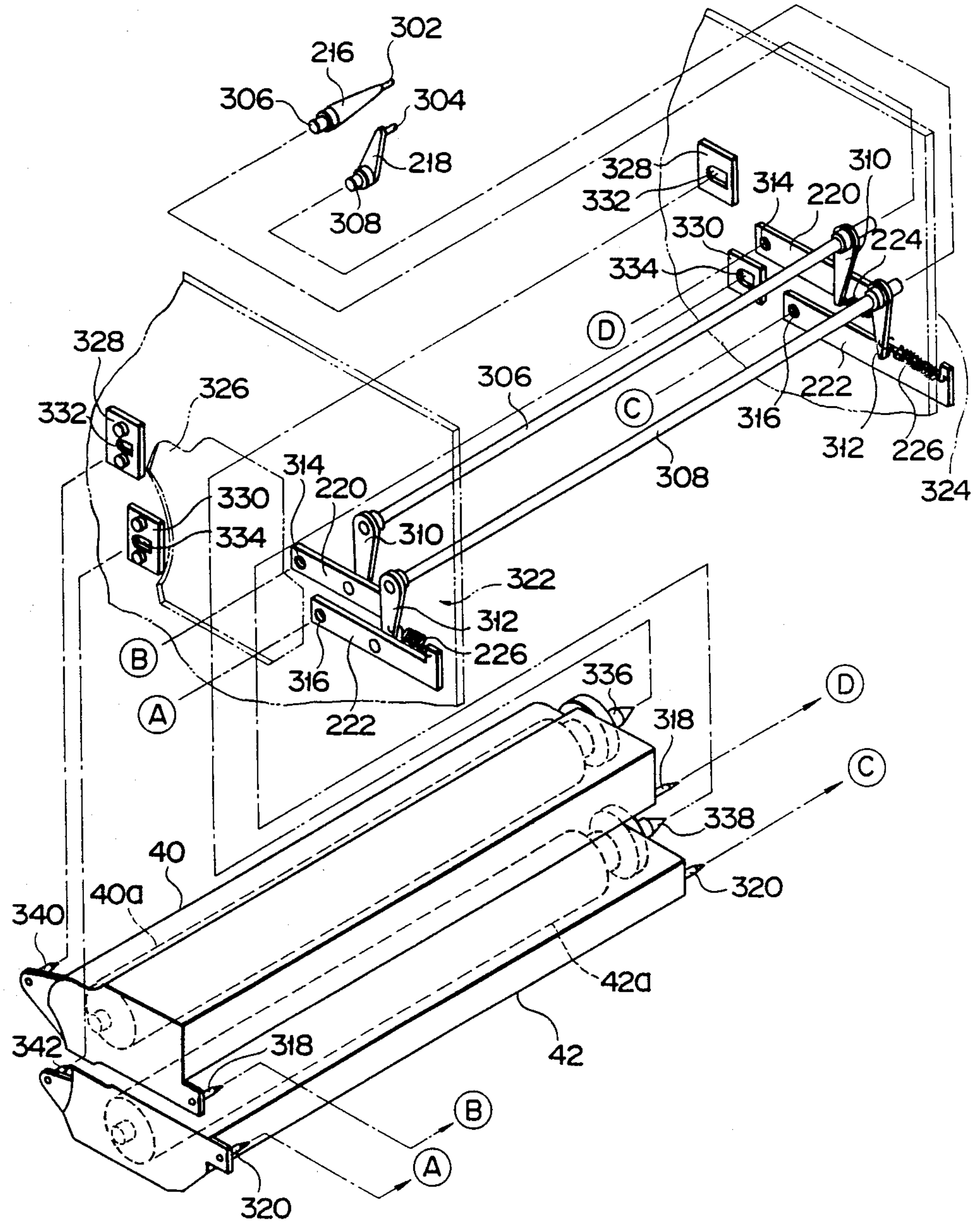
FIG. 6 is a perspective, exploded view of the apparatus shown in FIG. 5.

As is shown in FIG. 6, opening 326 is made in front frame 322 of the copying machine. Developing units 40 and 42 can be inserted into, and removed from, the copying machine through this opening 326. Guide 328 is provided on front frame 322. Similarly, guide 330 is provided on rear frame 324 of the copying machine. Elongated guide holes 332 and 334 are cut in guides 328 and 330, respectively. Shaft 336 of developing roller **40*a*, and shaft 338 of developing roller 40*b* are inserted into guide holes 332 and 334, respectively, from the rear of developing units 40 and 42. Further, pins 340 and 342 are inserted into guide holes 332 and 338, respectively, from the front of developing units 40 and 42. Since guide holes 332 and 334 are elongated, developing units 40 and 42 can move toward and away from photoconductive drum 26**.

Figure 7:
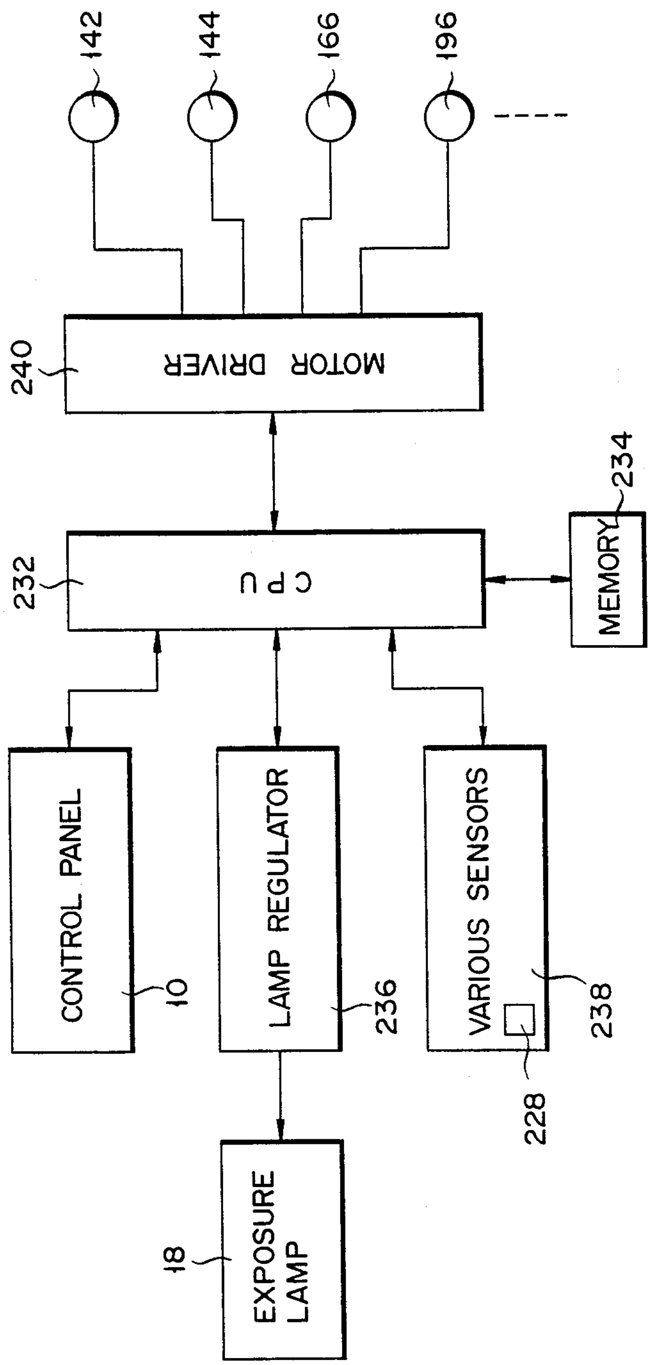
FIG. 7 is an electric circuit diagram of the apparatus shown in FIG. 5.

FIG. 7 shows electric circuits of the shifting apparatus for developing units 40 and 42. Numeral 232 designates a CPU, which supplies signals for the operations of various attachments for the copying machine, in accordance with a program stored in memory 234. CPU 232 is connected with the various attachments, which include control panel 10, lamp regulator 236, various sensors 238, such as switch 228, and motor driver 240. Regulator 236 serves to drive exposure lamp 18. Driver 240 is used to drive motor 142 for first and second carriages 84 and 86, motor 144 for first and second developing units 40 and 42 and other elements, motor 166 for photoconductive drum 26 and other elements, and motor 196 for the selection between developing units 40 and 42. Also, CPU 232 is connected with driver circuits (not shown) of spot light source 88 and erase array 90.

The operations based on the program stored in memory 234 will now be described in detail.

In a normal standby state such that the copying operation is off, both first and second developing units 40 and 42 are separated from photoconductive drum 26. This separation between drum 26 and units 40 and 42 is detected by switch 228.

If copy key 92 is operated after second developing unit 42, for example, is selected by means of color change key 110, CPU 232 supplies motor driver 240 with a selection command signal for first and second developing units 40 and 42. In response to this signal, driver 240 actuates motor 196. As a result, second unit 42 is caused to engage photoconductive drum 26. This engagement is detected by switch 228. A detection signal from switch 228 is fed to driver 240 via CPU 232. In response to this signal, motor driver 240 stops motor 196. Thereafter, exposure lamp 18 is turned on, and motors 142, 144 and 166 are driven. Thus, copying operation is performed with use of second developing unit 42.

After the end of the copying operation, motor 196 is driven by motor driver 240 in response to a signal from CPU 232. As a result, second developing unit 42 is separated from photoconductive drum 26. When unit 42 is moved to a predetermined position, such movement is detected by switch 228. Motor 196 is stopped in response to a detection signal from switch 228. Thus, first and second developing units 40 and 42 are restored to the standby position where they are separated from drum 26.

In the standby state, according to the embodiment described above, first and second developing units 40 and 42 are separated from photoconductive drum 26, so that the drum can be kept from being damaged by the developing units. Thus, resulting images can be prevented from being lowered in quality, and drum 26 can enjoy a prolonged life.

A second embodiment of the present invention will now be described. In this embodiment, memory 234 is stored with a program different from the one used in the first embodiment. The following is a description of operations based on this alternative program.

In a normal standby state such that the copying operation is off, both first and second developing units 40 and 42 are separated from photoconductive drum 26. This separation between drum 26 and units 40 and 42 is detected by switch 228. At this time, moreover, motor 144 is rotated, so that the inside of housing 2 is cooled.

If copy key 92 is operated after second developing unit 42 is selected by operation on control panel 10, CPU 232 supplies motor driver 240 with a stop command signal for motor 144. In response to this signal, driver 240 stops motor 144. Thereafter, CPU 232 supplies driver 240 with a selection command signal for unit 42. In response to this signal, driver 240 actuates motor 196. As a result, second unit 42 enages photoconductive drum 26. This engagement is detected by switch 228. A detection signal from switch 228 is fed to driver 240 via CPU 232. In response to this signal, motor driver 240 stops motor 196. At this time, gear 158 of unit 42 is caused to engage stopping gear 152. Thereafter, exposure lamp 18 is turned on, and motors 142, 144 and 166 are driven. Thus, a copying operation is performed with use of second developing unit 42.

After the end of the copying operation, motor 144 is first stopped. Thereupon, gear 152 and gear 158 of second developing unit 42 are stopped. Thereafter, motor 196 is actuated. As a result, unit 42 is separated from photoconductive drum 26. When unit 42 is moved to a predetermined position, such movement is detected by switch 228. Motor 196 is stopped in response to a detection signal from switch 228. Thus, first and second developing units 40 and 42 are restored to the standby position where they are separated from drum 26.

In associating with or disengaging first and second developing units 40 and 42 from photoconductive drum 26, according to this embodiment, motor 144 is first stopped. Thereafter, motor 196 is actuated, so that developing units 40 and 42 are moved. Thus, when gears 160 and 158 of units 40 and 42 engage or are disengaged from gear 152, gear 152 is at a standstill, so that noises are prevented. Also, gears 152, 160 and 158 can be prevented from being damaged.

A third embodiment of the present invention will now be described. In this embodiment, memory 234 is stored with a program different from the ones used in the foregoing embodiments. The following is a description of operations based on this alternative program.

Let it be supposed, for example, that second developing unit 42 is caused to engage photoconductive drum 26 so that copying operation is performed with of unit 42, as shown in FIG. 5.

After the end of the copying operation, CPU 232 supplies motor driver 240 with an operation command signal for motor 196. In response to this signal, driver 240 actuates motor 196. As a result, second developing unit 42 is separated from photoconductive drum 26. When unit 42 is separated from drum 26 in this manner, such separation is detected by switch 228. A detection signal from switch 228 is fed to motor driver 240 via CPU 232. In response to this signal, driver 240 stops motor 196. Thus, when the copying operation is off, first and second developing units 40 and 42 are separated from drum 26.

In a standby state such that both first and second developing units 40 and 42 are separated from photoconductive drum 26, CPU 232 supplies motor driver 240 with an operation command signal for motor 144 in the standby state. In response to this signal, driver 240 drives motor 144 at a speed lower than that for the copying operation. During the standby period, therefore, cooling fan 82 is driven at a speed lower than that for the copying operation. Thus, the inside of housing 2 is cooled.

If copy key 92 of control panel 10 is operated during the standby period, motor 144 is first stopped, for example, and motor 196 is actuated thereafter. Thereupon, the currently selected developing unit, e.g., second developing unit 42, is moved and caused to engage photoconductive drum 26. Thereafter, motor 144 is driven at a normal speed for the copying operation.

In the standby state or when the copying operation is off, according this embodiment, first and second developing units 40 and 42 are separated from photoconductive drum 26. During the standby period, therefore, cooling fan 82 can be driven by means of motor 144 to cool the inside of housing 2. Accordingly, it is unnecessary to separately provide an additional cooling fan, so that the number of components required can be reduced.

During the standby period, moreover, motor 144 is driven at a speed lower than that for the copying operation. Thus, the level of noises from cooling fan 82 can be lowered.

According to the embodiments described herein, the present invention is applied to a copying machine which uses two developing units. Alternatively, however, the invention may be applied to a copying machine using only one developing unit, for example.

What is claimed is:

1. A copying machine, comprising:

means for developing an image on an image carrier;

means for cooling the inside of the copying machine;

means for supporting said developing means so that said developing means can be associated with or disengaged from the image carrier;

first driving means for driving said developing means and said cooling means; and second driving means for driving said supporting means so that said developing means is associated with the image carrier at the start of developing operation and is disengaged from the image carrier after the developing operation, said first driving means driving said cooling means at a lower speed when said developing means is disengaged from the image carrier than when said developing means is associated with the image carrier.

2. The copying apparatus according to claim 1, wherein said developing means includes a plurality of developing units, and said second drive means drives the supporting means so that the developing units are alternately brought into contact with the image carrier.

3. The copying apparatus according to claim 1, wherein said means includes first and second drive means for driving the developing means and the supporting means, respectively, said first means being adapted to stop the developing means from operating when said second means drives the supporting means to move the developing means.

4. The copying apparatus according to claim 1, wherein said cooling means includes a cooling fan.

5. The copying apparatus according to claim 2, wherein said second drive means drives the supporting means so that one of the developing units is brought into contact with the image carrier at the beginning of the developing operation, and all of the developing units are separated from the image carrier at the end of the developing operation.

6. A copying machine, comprising:

a plurality of developing means for developing an image carried on animage carrier;

cooling means for cooling the inside of said copy machine;

means for selectively shifting each developing means between a first position adjacent said image carrier and a second position distant from said image carrier, said shifting means including a motor, a cam rotated by said motor, and a link mechanism displaced by said cam for selectively shifting said developing means; and driving means for driving said developing means and said cooling means, wherein said driving means drives said cooling means at a lower speed when said developing means are distant from said image carrier than when said developing means are adjacent to said image carrier.

7. The copying machine of claim 6 wherein the drive means includes first and second means for driving the developing means and the supporting means, respectively, said first drive means being adapted to stop the developing means from operating when said second means drives the support means to move the developing means.

8. The copying machine of claim 6 wherein said second drive means drives the supporting means so that one of the developing units is brought into contact with the image carrier at the beginning of the developing operation, and all of the developing units are separated from the image carrier at the end of the developing operation.

* * * * *